United States Patent

[11] 3,544,730

[72] Inventor Brian E. Voss
Georgetown, Ontario, Canada
[21] Appl. No. 742,925
[22] Filed July 5, 1968
[45] Patented Dec. 1, 1970
[73] Assignee Northern Electric Company Limited
Montreal, Quebec, Canada

[54] TRUNK SIGNALLING AND SUPERVISION CONTROL
6 Claims, 3 Drawing Figs.

[52] U.S. Cl. .......... 179/18, 179/18(TRK)
[51] Int. Cl. .......... H04m 7/06
[50] Field of Search .......... 179/22, 18.211, 18(TRK)

No References Cited

*Primary Examiner*—Kathleen H. Claffy
*Assistant Examiner*—Thomas W. Brown
*Attorney*—Curphey and Erickson

ABSTRACT: This disclosure relates to an outgoing truck signalling and supervision arrangement for a common control switching system wherein the sender does not have direct access to the outgoing trunk but instead has access to an originating junctor positioned between the line and trunk switching networks. Signalling in such a system is provided by a first relay positioned in the originating junctor for connecting the sender to the outgoing trunk through the truck switching network and for holding the trunk switching network and the outgoing trunk. A second relay is positioned in the outgoing trunk which is responsive to the release of the sender when the required digits have been outpulsed for holding the trunk switching network and the trunk and for connecting the talking and supervisory path to the distant office.

*INVENTOR*
B.E. VOSS
AGENTS
*Curphey & Erickson*

INVENTOR
B.E.VOSS
AGENTS
Curphey & Erickson

TRUNK SIGNALLING AND SUPERVISION CONTROL

This invention relates to common control switching systems and more particularly to a novel outgoing trunk signalling and supervision arrangement for use with a common control switching system.

In the No. 5 crossbar common control switching system the sender has direct communication with the outgoing trunks and may perform directly the functions which are necessary to control the outgoing trunks. However in the SF1 common control switching system, which has been developed recently and published in the Nov. 1967 issue of Telesis and in Northern Electric Bulletin T194-B, the sender does not have direct access to the outgoing trunk but has access to an originating junctor which is located between the line switching network and the trunk switching network. Consequently some other means had to be designed to control the outgoing trunk connected to the trunk switching network.

It is therefore the main feature of the present invention to provide an outgoing trunk signalling and supervision arrangement which will provide signalling to the outgoing trunk for the purpose of alerting the distant office and then pass over the supervision of the call to the outgoing trunk. This is accomplished as follows: A first switching means is provided in the originating junctor for connecting the sender to the outgoing trunk through the trunk switching network and for holding the trunk switching network and the outgoing trunk. A second switching means is then provided in the outgoing trunk, which is responsive to the release of the sender when the required digits have been outpulsed, for holding the switching network and the trunk and for connecting the talking and supervisory path to the distant office.

The invention will now be disclosed with reference to the drawings which illustrate a preferred embodiment of the invention with no intention however to limit the scope of the invention to the embodiment disclosed. In the drawings.

Figure 1:
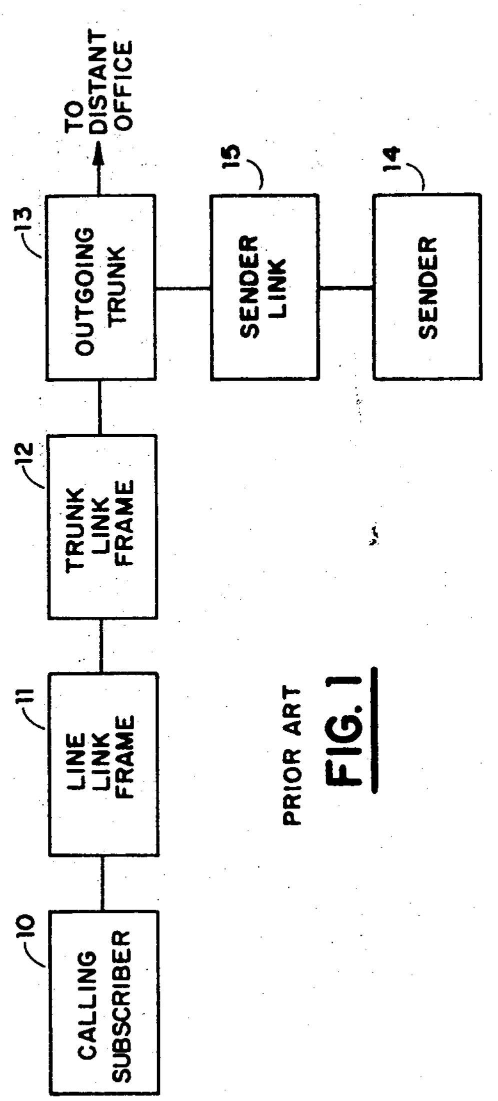
PRIOR ART FIG. 1
FIG. 1 illustrates an outgoing trunk connection in the No. 5 crossbar common control switching system.

FIG. 1 illustrates an outgoing trunk connection in the No. 5 crossbar common control switching system. The connection is from a calling subscriber 10 to a distant office through a line link frame 11, a trunk link frame 12, and an outgoing trunk 13. A sender 14 is connected to outgoing trunk 13 through a sender link 15. The above elements are illustrated in a block diagram form because they are conventional and well known in the art. A description of these blocks may be found in U.S. Pat. No. 2,585,904 issued to A. J. Busch on 19th Feb., 1952. Other elements are also involved in establishing an outgoing trunk connection. However such elements are not shown because they are not necessary to the understanding of the invention. The elements shown clearly establish that the sender in the No. 5 common control switching system has direct access to the outgoing trunk for performing its signalling functions and then passing supervision of the call to the outgoing trunk.

Figure 2:
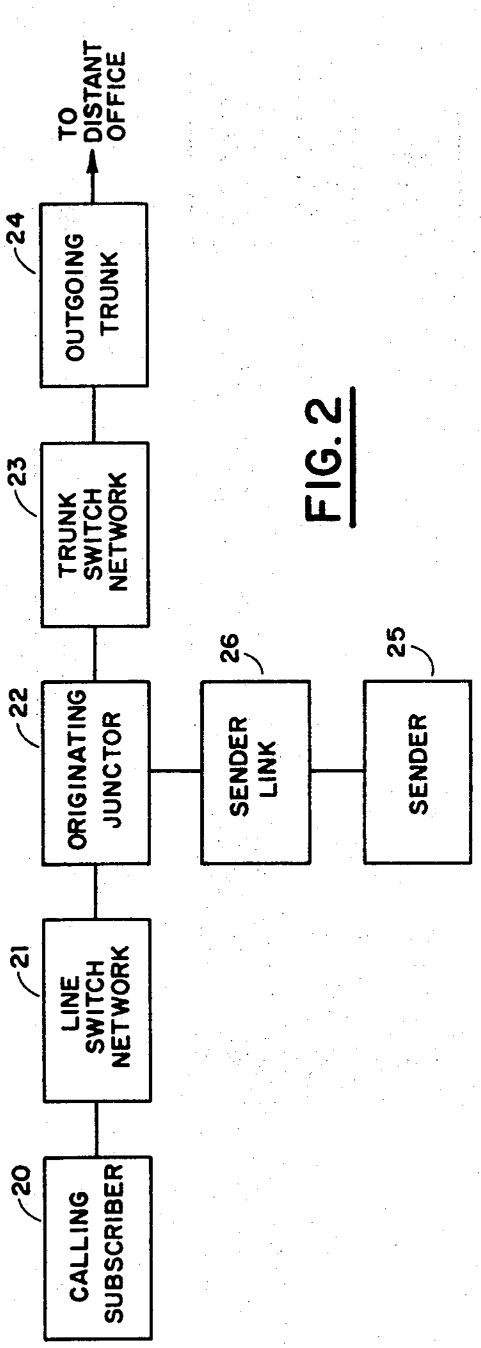
FIG. 2 illustrates an outgoing trunk connection in the SF1 common control switching system.

FIG. 2 illustrates an outgoing trunk connection in the SF1 common control switching system. The connection is from a calling subscriber 20 to a distant office through a line switching network 21, an originating junctor 22, a trunk switching network 23 and an outgoing trunk 24. A sender 25 is connected to the originating junctor 22 through a sender link 26. Other elements are also involved in establishing an outgoing trunk connection. However such elements are not disclosed because they are not necessary to the understanding of the invention. The elements appearing in FIG. 2 illustrate that the sender 25 in the SF1 common control system does not have direct access to the outgoing trunk 24 for performing its control functions. Sender 25 is connected to originating junctor 22 which joins the line switching network 21 to the trunk switching network 23.

Figure 3:
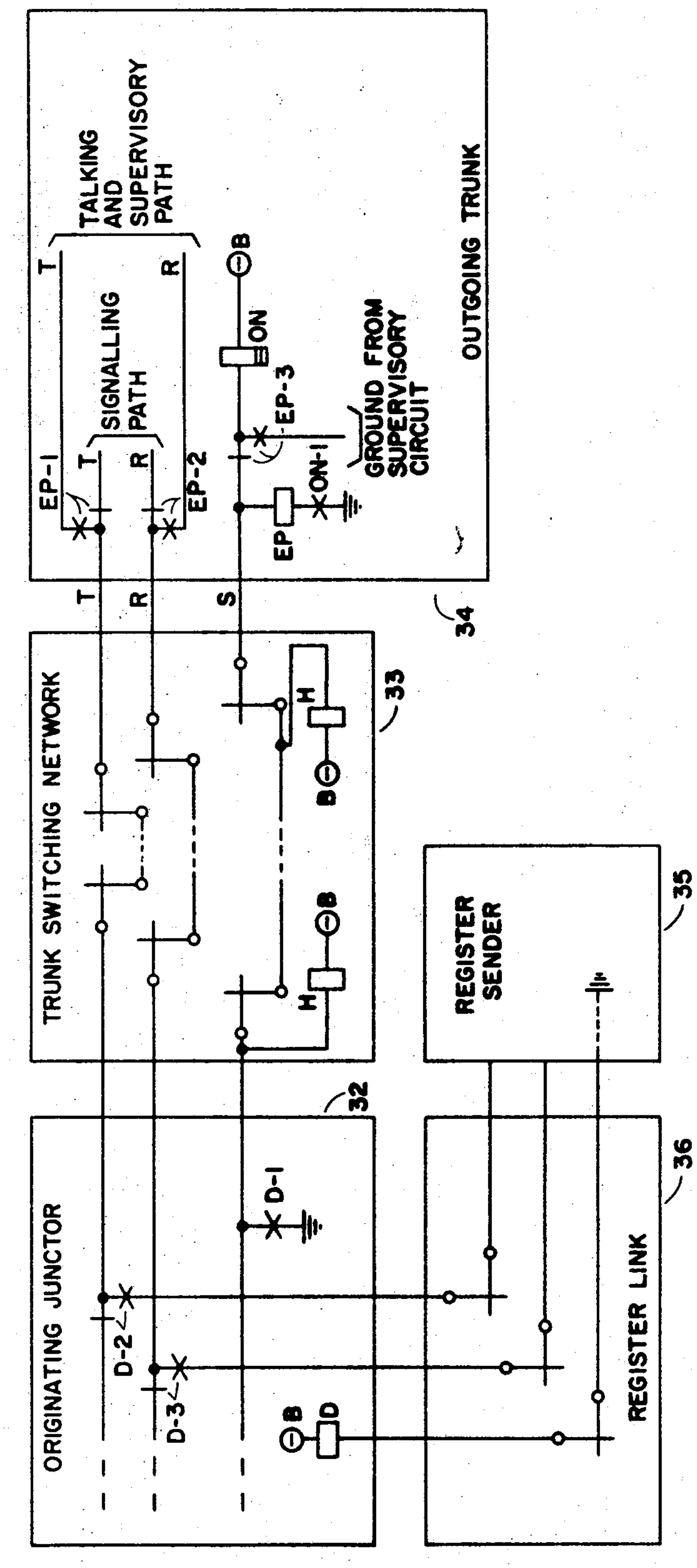
FIG. 3 illustrates the elements which provide signalling and supervision for an outgoing trunk in accordance with the invention.

FIG. 3 illustrates an originating junctor 32, a switching network 33, an outgoing trunk 34, a register-sender 35 and a register-sender link 36 which correspond to elements 22—26 of FIG. 2. The originating junctor 32 includes a relay D having normally open contacts D-1 and transfer contacts D-2 and D-3. The outgoing trunk includes a relay ON which is operated when the trunk is seized and a low resistance relay EP whose function will be disclosed later.

When the register-sender is ready to out-pulse the required digits to the distant office, it operates relay D which closes contacts D-1 to maintain a ground on the hold magnet of the switching network 33 and on the sleeve of the trunk to hold the connection to the outgoing trunk 34. In addition, it operates transfer contacts D-2 and D-3 to establish a signalling path between the register-sender 35 and the tip and ring leads of the outgoing trunk 34 to the distant office.

After outpulsing has been completed, the register-sender releases relay D. The release of relay D opens contacts D-1 and removes the ground applied to the sleeve lead S of the trunk by the originating junctor. In the outgoing trunk, the removal of the ground from the sleeve S places relay EP in series with hold magnets H of the switching network through closed contacts ON-1 of relay ON. Relay ON is held operated by the ground through relay EP until relay EP operates, at which time it is held operated by the ground from subscriber's supervisory circuits. Relay ON is a slow release relay and consequently the subscriber's supervisory ground becomes available before relay ON can release. The outgoing trunk supervisory circuit is of the type known in the art and consequently not shown in detail.

Since relay EP is a low resistance relay, the current flowing through hold magnet H of the switching network and relay EP is sufficient to hold the switching network under the control of contacts ON-1 of relay ON.

The energization of relay EP operates transfer contacts EP-1 and EP-2 to connect the talking and supervisory pair of the outgoing trunk to the distant office in place of the signalling pair. The operation of relay EP also operates transfer contacts EP-3 to put relay ON under the control of the calling or called party supervisory ground.

When the connection is no longer required, ground from the supervisory circuit is removed and relay ON is released, opening contacts ON-1. The opening of contacts ON-1 releases relay EP and the hold magnets of the switching network, thus restoring the system to normal.

I claim:

1. An outgoing trunk signalling and supervision arrangement comprising:
   - a. a first switching network connected to a calling subscriber;
   - b. a second switching network connected to an outgoing trunk to a distant office;
   - c. an originating junctor joining the first and second switching networks;
   - d. a sender adapted for connection to said originating junctor for signalling the distant office;
   - e. a first switching means in said originating junctor for connecting said sender to said outgoing trunk through said second switching network and for holding the second switching network and the trunk; and
   - f. a second switching means in said outgoing trunk responsive to the release of the sender when the required digits have been sent to the distant office for holding the switching network and the trunk and for connecting a talking and supervisory path to the distant office.

2. An outgoing trunk signalling and supervision arrangement as defined in claim 1 wherein said outgoing trunk has a tip, a ring and a sleeve lead and wherein said first switching means is a first relay having sets of transfer contacts for connecting the sender to the tip and ring leads, and further contacts for grounding the sleeve of the trunk.

3. An outgoing trunk signalling and supervision arrangement as defined in claim 2 including hold magnets in said second switching networks for holding the connection through the second switching network and wherein said second switching means is a second relay which is energized in series with said hold magnets when ground is removed from the sleeve lead upon release of the sender.

4. An outgoing trunk signalling and supervision arrangement as defined in claim 3 wherein said second relay has sets of transfer contacts which are operated to connect the talking and supervisory path to the outgoing trunk.

5. An outgoing trunk signalling and supervision arrangement as defined in claim 3 wherein said outgoing trunk includes a slow release relay connected to the sleeve lead of trunk and wherein said second relay includes another set of transfer contacts which disconnect said slow release relay from the sleeve of the trunk and put it under the control of a trunk supervisory circuit.

6. An outgoing trunk signalling and supervision arrangement as defined in claim 5 wherein said slow release relay has a pair of contacts in the energization path of said second relay whereby the release of the trunk supervisory circuits releases the slow release relay and removes the holding connection for the trunk switching network, thereby restoring the system to normal.